United States Patent [19]

Buzzi et al.

[11] 4,065,977
[45] Jan. 3, 1978

[54] RECIPROCATING VIBRATING DRIVE

[75] Inventors: Leo Buzzi; Peter Malobabic, both of Klagenfurt, Austria

[73] Assignee: U.S. Philips Corporation, New York, N.Y.

[21] Appl. No.: 703,448

[22] Filed: July 8, 1976

[30] Foreign Application Priority Data

July 28, 1975 Austria .................................. 5835/75

[51] Int. Cl.² ............................................. F16H 21/18
[52] U.S. Cl. ............................................. 74/49; 30/90
[58] Field of Search .................. 30/90, 93, 75, 78, 85; 74/142, 128, 49

[56] References Cited

U.S. PATENT DOCUMENTS

| 2,650,993 | 9/1953 | Brown et al. | 74/49 |
| 3,672,049 | 6/1972 | Demci et al. | 30/90 |

*Primary Examiner*—Samuel Scott
*Assistant Examiner*—Wesley S. Ratliff, Jr.
*Attorney, Agent, or Firm*—Frank R. Trifari; Rolf E. Schneider

[57] ABSTRACT

A vibratory drive assembly for use with an electric motor driven apparatus comprising a plate driven in reciprocating vibratory movement and mounted on a frame via integral hinge strips which are arranged with their longitudinal directions transverse to the direction of vibratory movement and transverse to the longitudinal direction of an associated pin-shaped drive element.

7 Claims, 7 Drawing Figures

RECIPROCATING VIBRATING DRIVE

BACKGROUND OF THE INVENTION

1. Field of the Invention

This invention relates to a vibratory drive assembly for use with a tool or apparatus component which performs a reciprocating vibratory movement, and more particularly to such an assembly for parallel guidance having a plate guided between integral hinge strips extending transversely to the direction of vibratory movement, each such strip being hingedly connected to one end to the plate and at the other end to a stationary part of the apparatus.

2. Description of the Prior Art

Integral hinges, such as those described in U.S. Pats. No. 3,672,049 and 3,714,711, enable accurate parallel guidance of an apparatus component which is to undergo reciprocating vibratory movement. This provides a simple and relatively compact drive connection for apparatus having a reciprocating attachment or tool component, such as a massage attachment, a nail polisher, or the moveable cutter of a dry shaver or hair trimmer. In known appliances equipped with such integral hinges, the hinges are arranged with their longitudinal directions essentially parallel to the longitudinal direction of an associated pin-shaped drive element for the attachment or tool. However, this arrangement does not permit ready design for a compact apparatus, because of the space required to accommodate the integral hinges approximately parallel to the drive element.

SUMMARY OF THE INVENTION

The object of the invention is to provide a compact drive assembly for use with a reciprocating vibratory tool or attachment.

A further object of the invention is to provide a vibratory bridge assembly which can be formed as a unitary molded part having simple surfaces generally parallel or perpendicular to each other.

In accordance with the invention a plate is mounted for vibratory movement in a given direction transverse to the axis of an associated pin-shaped driving element, the plate being connected to a frame and guided for reciprocating motion by elongated hinge strips having a direction of elongation transverse to the axis of the pin-shaped driving element and to said given direction, each strip being hingedly connected at one end to the plate and being hingedly connected at its other end to the frame; the frame, strips and plate being parts of a vibratory bridge assembly.

In a preferred embodiment the vibratory plate is connected to the load by a pin-shaped drive element; the plate is itself driven by an eccentric pin having an axis parallel to that of the drive element, the eccentric pin being rotated about a drive axis also parallel to the pin axis; and the plate, hinge strips, frame portions immediately connected to the hinge strips, and connection between the eccentric pin and the plate are all formed as portions of one unitary element having planar upper and lower surfaces.

In yet another preferred embodiment, the plate is hingedly connected to the hinge strips at diagonally opposite locations, the hinge strips extending in opposite parallel directions from the plate to the respective frame portions.

In accordance with the invention, therefore, the space required for the hinge strips is reduced to their width as viewed in the longitudinal direction of the pin-shaped drive element, this width being substantially smaller than the length of such strips. This provides the additional advantage that components of load forces extending in the longitudinal direction of the pin-shaped drive element do not overload the hinge strips so as to distort their shape or change their length, because the cross-sectional profile of the hinge strips provides a high resistance against deformation due to such forces.

In still another preferred embodiment of the invention, the driving pin is connected to the plate via a connecting rod having a longitudinal axis transverse to the elongation direction of the hinge strips, and disposed between said hinge strips, the connecting rod being hingedly connected to one end to the plate, and formed as part of a unitary element with the plate.

By way of example, the preferred embodiments of apparatus according to the invention will now be described with reference to the attached drawing.

DESCRIPTION OF THE PREFERRED EMBODIMENTS

Figure 1:
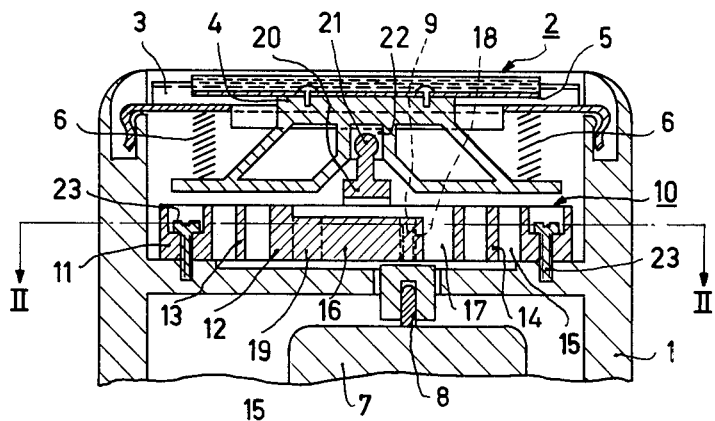
FIG. 1 is a sectional side view of a dry shaving apparatus with a vibratory bridge assembly according to the invention, said view being taken along the line I—I of FIG. 2.

As shown in FIG. 1, a dry shaving apparatus has a housing 1 onto which a shaving head generally designated as 2 is fitted. The shaving head comprises a stationary cutter 3 and a reciprocable counter-cutter 5, each being provided with cutting teeth, the counter-cutter 5 which is the load for the vibratory drive to be discussed subsequently being disposed on a carrier 4. Springs 6 act between the stationary cutter 3 and the carrier 4 to keep the counter-carrier 5 in engagement with the stationary cutter 3. To drive the counter-cutter 5, the shaver includes an electric motor 7 having a rotary output shaft 8, and an eccentric pin 9 mounted at the end of the motor shaft 8, the longitudinal axis of the pin 9 being offset from the axis of the shaft 8. Since it is well known that obtaining satisfactory shaving performance requires that the driven counter-cutter 5 have an exact reciprocating vibratory movement, so that the cutting faces of the driven counter-cutter and the stationary cutter can always engage each other snugly, transmission of the movement of the eccentric pin 9 to the counter-cutter 5 is provided through a vibratory bridge assembly 10; the use of this bridge assembly also provides some freedom in positioning the electric motor inside the apparatus, independent of the position of the load or the counter-cutter which it drives.

The vibratory bridge assembly comprises a stationary frame 11 and a plate 12 arranged inside the frame, and two integral hinge strips 13 and 14 which guide the plate for translatory movement within the frame. The integral hinge strips 13 and 14 extend generally parallel to each other at opposite ends of the plate 12 as viewed in the direction of plate movement, the hinge strips extending transversely to the direction of movement and transversely to the axis of the pin 9. Each hinge strip 13 and 14 is connected at a first end to the plate 12, and at a second end to an attachment portions of the frame strip 15 of the frame 11, which frame strip extending parallel to the direction of vibratory movement.

To transmit the motion of the eccentric pin 9, a connecting rod 16 is disposed inside a cut-out 17 formed within the plate 12, one end of the rod 16 having a bore 18 in which the eccentric pin 9 is engaged. The other end of the connecting rod 16 is connected to the plate 12 by an integral hinge 19, the rod 16 thus being disposed between the hinge strips 13 and 14, its longitudinal axis extending substantially transversely to the hinge strips. To transmit movement of the bridge assembly to its load, the plate 12 also includes a link 20 which transverses a portion of the cut-out 17 above the connecting rod 16; and a pin-shaped drive element 21 having a free end projecting into a slot 22 formed in the carrier 4 extends from the link 20, the axis of pin-shaped drive element 21 being parallel to the axis of eccentric pin 9. The vibratory bridge assembly is also removably fastened to the apparatus housing by screws 23 which extend through the frame 11 into the housing 1.

As described above, the integral hinge strips 13 and 14 are arranged with their longitudinal directions extending transversely to the longitudinal direction of the pin-shaped drive element 21, and the hinge strips extend in the same direction parallel to each other from the attachment portions of the frame strip 15 to the plate 12. The hinge strips 13 and 14 have a width, and the plate 12 has a thickness, each equal to the height of the frame 11. The connecting rod 16 may have a thickness slightly smaller than the plate 12, so that the bridge assembly 10 constitutes a flat structural unit from which only the pin-shaped drive element 21 projects. In a preferred construction of this embodiment, the frame 11, plate 12, hinge strips 13 and 14, connecting rod 16, link 20 and drive element 21 are all integrally formed parts of a unitary element, for example, formed by molding from a plastic material.

In the embodiment described above, the vibratory bridge assembly has integral hinge strips whose length is a minimum to provide exact parallel guidance of the reciprocal load, yet as viewed in the longitudinal direction of the drive element, the bridge assembly requires extremely little space and therefore permits a very compact apparatus construction.

Figure 3:
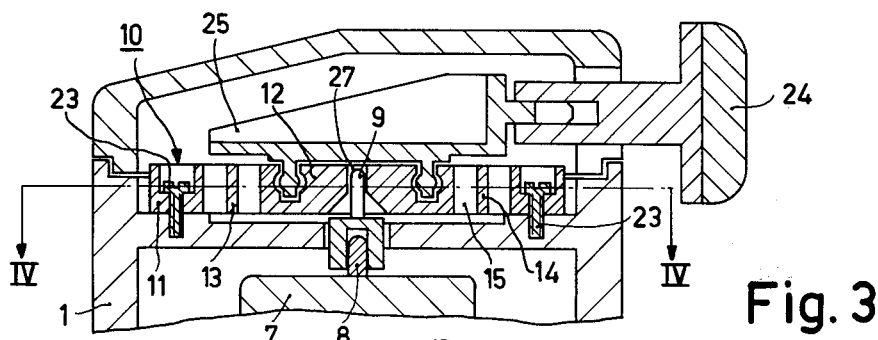
FIG. 3 is a sectional side view of a massage apparatus embodiment of the invention, said view being taken along the line III—III of FIG. 4.
Figure 4:
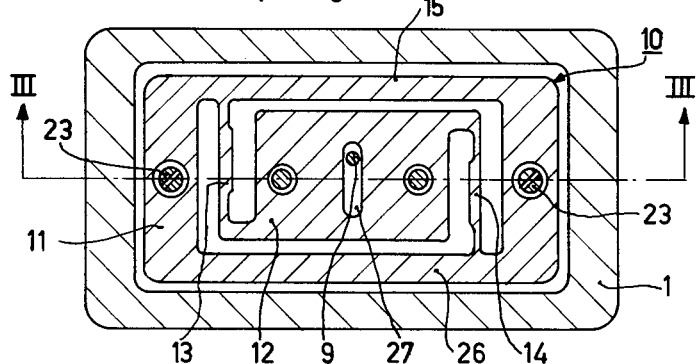
FIG. 4 is a sectional top view of the apparatus of FIG. 3 along the line IV—IV.

FIGS. 3 and 4 show a massage apparatus having a tool 24 which is to have a reciprocating vibratory movement. As in the preceding example, an electric motor 7 has a drive shaft 8 at whose end there is mounted an eccentric pin 9. To convert movement of the eccentric pin into reciprocating vibratory movement, a vibratory bridge assembly 10 is provided, having a plate 12 which is guided for parallel movement by integral hinge strips 13 and 14. An intermediate portion 25, to which the tool 24 is fitted, is connected to the plate 12 by pin-shaped drive elements engaging matching holes in the plate 12. It is clear that, as an alternative embodiment, the plate 12 and the intermediate portion may be one integral unit, and if desired the tool 24 may also be incorporated within that unit.

Figure 2:
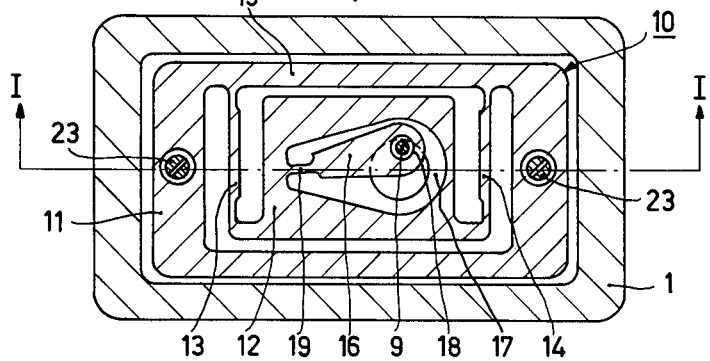
FIG. 2 is a sectional top view of the apparatus of FIG. 1 along the line II—II.

The vibratory bridge assembly is similar to that shown in FIGS. 1 and 2, except for the means by which the plate 12 is driven by the motion of the eccentric pin 9, and the relative positions of the points of connection of the hinge strips 13 and 14. The first end of the hinge strip 13, disposed at one end of the plate 12 in the given direction of movement, is connected to the plate 12, and the second end is connected to an attachment portion of the frame strip 15 extending parallel to the direction of vibratory movement at one side of the plate; and the hinge strip 14 is connected at its first end to the plate 12 adjacent said frame strip 15 and extends in a direction parallel to the hinge strip 13 for connection of its second end to an attachment portion of the frame strip 26, parallel to frame strip 15, of the frame 11 diagonally opposite the attachment portion for the hinge strip 13. With this configuration a particularly accurate parallel guidance is obtained for the plate 12. Further, since the longitudinal direction of the integral hinge strip is transverse to the longitudinal direction of the drive element, the cross-sectional profile of the hinge strip is oriented so as to offer high resistance to components of force which act in the longitudinal direction of the pin-shaped drive elements. This configuration is especially advantageous in a massage apparatus, because of the likelihood of reactive forces occurring in widely varying directions.

This configuration is also particularly advantageous if it is desired to mold the plate, hinge strips, and frame as one unitary element using plastic material, because the bridge assembly has essentially flat and parallel upper and lower faces, and all holes and cut-outs have walls perpendicular to those faces extending all the way through except in the case of countersunk or counter board holes for screws which mount the bridge assembly to the housing 1.

This embodiment also shows a simple connection for the eccentric pin 9, which engages directly in a slot 27 formed in the plate 12, the longitudinal direction of the slot being parallel to the longitudinal direction of the hinge strips. Alternatively, it would also be possible to drive the plate 12 by an oscillating-armature motor, the free end of the armature lever of such a motor engaging the slot 27.

Figure 5:
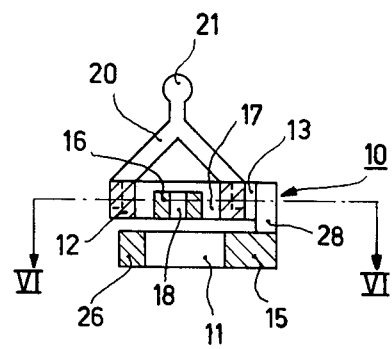
FIG. 5 is an end view in cross-section of another embodiment of a vibratory bridge assembly suitable for use in the apparatus of FIG. 1, said view being taken along the line V—V of FIG. 6.
Figure 6:
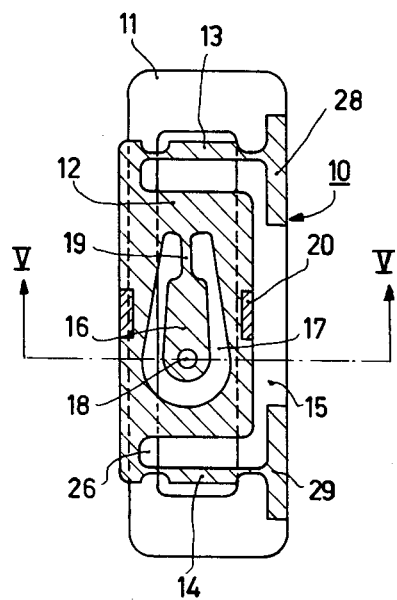
FIG. 6 is a sectional top view of the vibratory bridge assembly of FIG. 5 along the line VI—VI.

In other applications it may be desirable that a vibratory bridge assembly of the type described generally above also meet a requirement that its dimension in the longitudinal direction of the hinge strips be as small as possible, at the same time that a specific minimum length of the hinge strips is maintained. FIGS. 5 and 6 show an example of a solution to this apparatus requirement, in which attachment portions 28 and 29 are formed as projections from a frame strip 15 of a frame 11, such frame strip extending parallel to the direction of vibratory movement, and the projections extending parallel to each other in the direction of the axis of the drive pin for the bridge assembly. The plate 12 is therefore disposed parallel to the frame 11 so that for a given length of the hinge strips the corresponding portion of the frame need not exceed the length of the integral hinge strips. Obviously, by analogy with the example of FIGS. 3 and 4, another alternative would provide the attachment projections 28 and 29 respectively arranged on mutually opposite frame strips 15 and 26 of the frame 11, the second ends of the hinge strips 13 and 14 being respectively connected to the attachment projections 28 and 29. In this embodiment the pin-shaped drive element 21 is shown as a separate part, connected to the plate 12 by a snap connection.

Figure 7:
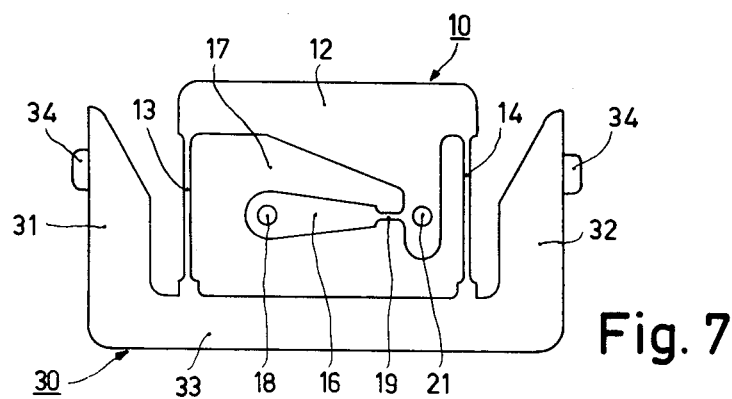
FIG. 7 is a plan view of a vibratory bridge assembly having a U-shaped carrier frame for the integral hinge strips.

In FIG. 7 there is shown still another embodiment of a vibratory bridge assembly, whose stationary part consists of a U-shaped carrier frame 30 having an elongated base 33 connecting two legs 31 and 32, the second ends respectively of the hinge strips 13 and 14 being connected thereto. Projections 34 on the legs 31 and 32 respectively form parts of a snap-connection, by means of which the legs may be detachably connected to an apparatus housing. Such a vibratory bridge assembly is very easily manufactured as a plastic unitary molding, having the shape of a simple plate with through cutouts.

Other embodiments and combinations and features of the above examples will also be evident to one of ordinary skill in the art, with regard both to differences in material and fabrication, as well as differences in configuration within the scope of the invention. For some purposes, the embodiment of FIG. 7 may be easily formed, for example, by stamping from a plate of metal. The frame, hinge strips and plate need not be parts of one unitary assembly but may for some purposes advantageously be formed from different materials or components so as to obtain the most advantageous properties of cost or performance of the various elements, in particular the hinge strips.

What is claimed is:

1. A vibratory bridge assembly for use in producing reciprocating vibratory movement of a load in response to rotation of an input eccentric, which comprises a plate, means for mounting said plate to allow reciprocating movement thereof in a given direction, means for connecting a load to said plate for movement the same as the plate movement, and means for moving said plate in reciprocating motion in response to rotation of an eccentric pin having a longitudinal axis, said mounting means comprising a frame having two attachment portions and two elongated hinge strips each having a first end and a second end, said hinge strips being elongated in a direction transverse to the longitudinal axis of said eccentric pin and transverse to said given direction of reciprocating movement, the first end of each hinge strip being integrally connected to the plate and the second end of each hinge strip being integrally connected to its respective frame attachment portion.

2. An assembly as claimed in claim 1, in which said frame is U-shaped and comprises two legs and an elongated base connecting the two legs and including the frame attachment portions to which said second ends are connected, said base being elongated in a direction parallel to said given direction.

3. An assembly as claimed in claim 1, in which said frame attachment portions are disposed at diagonally opposite locations with respect to said plate and with respect to said given direction.

4. An assembly as claimed in claim 1, in which said platemoving means includes a connecting rod having a longitudinal axis transverse to the direction of elongation of said hinge strips and disposed between said hinge strips, said connecting rod being hingedly connected at one end to said plate and at its other end to said eccentric pin.

5. An assembly as claimed in claim 4, in which the frame, the plate, the hinge strips, and the connecting rod are formed as a unitary element.

6. An apparatus for producing reciprocating vibratory movement of a load in response to rotation of an input eccentric, which comprises a plate, means for mounting said plate to allow reciprocating movement thereof in a given direction, means for connecting a load to said plate for movement the same as the plate movement, said connecting means comprising a pin-shaped drive element having a longitudinal axis transverse to said given direction of reciprocating movement, and means for moving said plate in reciprocating motion, said mounting means comprising a frame having attachment portions and two elongated hinge strips each having a first end and a second end, said hinge strips being elongated in a direction transverse to the longitudinal axis of said drive element and transverse to said given direction, the first end of each hinge strip being integrally connected to the plate and the second end of each hinge strip being integrally connected to its respective frame attachment portion.

7. An apparatus as claimed in claim 6, in which said moving means includes an eccentric pin having an axis parallel to the drive element axis and rotatable about a drive axis parallel to said drive element axis, and electric motor means for rotating said eccentric pin about said drive axis.

* * * * *

UNITED STATES PATENT AND TRADEMARK OFFICE
CERTIFICATE OF CORRECTION

PATENT NO. : 4065977
DATED : January 3, 1978
INVENTOR(S) : LEO BUZZI & PETER MALOBABIC It is certified that error appears in the above-identified patent and that said Letters Patent are hereby corrected as shown below:

Column 1, line 12, "connected to" should be --connected at--

Column 2, line 15, "connected to" should be --connected at--

Column 3, line 13, "portions" should be --portion--

Column 3, line 14, "which" should be --such--

Column 4, line 24, "element" should be --elements--

Signed and Sealed this

Ninth Day of May 1978

[SEAL]

Attest:

RUTH C. MASON
Attesting Officer

LUTRELLE F. PARKER
Acting Commissioner of Patents and Trademarks